United States Patent [19]
Egashira et al.

[11] Patent Number: 5,252,652
[45] Date of Patent: Oct. 12, 1993

[54] SOLID GOLF BALL

[75] Inventors: Yoshinori Egashira, Saitama; Kazuyuki Takahashi, Yokohama; Seisuke Tomita, Tokorozawa, all of Japan

[73] Assignee: Bridgestone Corporation, Tokyo, Japan

[21] Appl. No.: 521,618

[22] Filed: May 10, 1990

[30] Foreign Application Priority Data

Nov. 5, 1989 [JP] Japan .................... 1-118460

[51] Int. Cl.$^5$ ............ C08K 5/09; C08K 5/36; A63B 37/00
[52] U.S. Cl. .................. 524/392; 524/289; 524/382; 524/908; 273/218
[58] Field of Search ............ 524/908, 289, 382, 392

[56] References Cited

U.S. PATENT DOCUMENTS

| | | | |
|---|---|---|---|
| 2,378,519 | 6/1945 | Vincent | 524/392 |
| 2,467,789 | 4/1949 | Verbanc et al. | 524/382 |
| 2,543,845 | 3/1951 | Fryling | 524/392 |
| 3,175,992 | 3/1965 | Anderson, Jr. | 524/392 |
| 3,804,421 | 4/1974 | Alex et al. | 293/218 |
| 3,923,719 | 12/1975 | Gattuso | 524/392 |
| 4,076,255 | 2/1978 | Moore et al. | 273/218 |
| 4,129,538 | 12/1978 | Kaplan et al. | 524/392 |
| 4,398,000 | 8/1983 | Kataoka et al. | 523/206 |
| 4,556,220 | 12/1985 | Tomina et al. | 524/908 |
| 4,595,721 | 6/1986 | Devaux et al. | 524/392 |
| 4,683,257 | 7/1987 | Kakiuchi et al. | 524/908 |
| 4,735,980 | 4/1988 | Sturm et al. | 524/392 |
| 4,770,422 | 9/1988 | Isaac | 524/708 |

*Primary Examiner*—Kriellion S. Morgan
*Attorney, Agent, or Firm*—Sughrue, Mion, Zinn, Macpeak & Seas

[57] ABSTRACT

One-piece and multi-layered golf balls are improved in flying performance by forming the one-piece ball entirely or multi-layered golf ball core from a rubber composition comprising a base rubber, an unsaturated carboxylic acid metal salt, and an organic sulfur compound and/or a metal salt thereof.

13 Claims, 1 Drawing Sheet

SOLID GOLF BALL

This invention relates to solid golf balls having improved flying performance.

BACKGROUND OF THE INVENTION

In general, solid golf balls include a one-piece golf ball which is integrally molded in its entirety a two-piece golf ball having a core enclosed in a cover, and a multi-layered golf ball having a core enclosed in a cover through one or more intermediate layers.

These solid golf balls have an elastic portion in the form of a molded and vulcanized rubber compound as a portion, that is, a core in the case of multi-layered golf balls or as their entirety in the case of one-piece golf balls. For the purpose of improving the repulsion coefficient and impact resistance of the prior art rubber compositions from which the elastic portion was formed, attempts were made to blend a monomer having an unsaturated bond, typically an $\alpha,\beta$-ethylenically unsaturated carboxylic acid metal salt as a co-crosslinking agent in polybutadiene or a similar base rubber. The co-crosslinking agent will graft or crosslink to the backbone of polybutadiene rubber under the action of a peroxide or similar co crosslinking initiator, resulting in a three-dimensional crosslinked polymer, which can provide an adequate degree of hardness and durability for one-piece golf balls or multi-layered golf ball cores. Therefore, one-piece golf balls formed from rubber compositions having such a co-crosslinking agent blended and multi-layered golf balls having cores formed from rubber compositions having such a co-crosslinking agent blended are known to exhibit satisfactory flying performance and durability.

Golf players have a continuous demand for better flying performance and it is thus desired to develop golf balls having further improved flying performance.

SUMMARY OF THE INVENTION

Therefore, an object of the invention is to provide a golf ball having further improved flying performance.

Searching for an optimum additive for a rubber composition containing a base rubber, typically polybutadiene and an unsaturated carboxylic acid metal salt as a co-crosslinking agent, the inventors have found that when an organic sulfur compound and/or a metal-containing organic sulfur compound is added to the rubber composition, there is obtained a rubber composition which can be vulcanized into a rubbery elastomer having improved rebound resilience. If a one piece golf ball or a multi-layered golf ball core is formed from this rubber composition, the resulting solid golf ball exhibits an increased initial velocity upon hitting and improved flying performance. The present invention is predicated on this finding.

According to the present invention, there is provided a solid golf ball comprising a rubber composition containing a base rubber, an unsaturated carboxylic acid metal salt, and a sulfur compound selected from the group consisting of an organic sulfur compound and a metal-containing organic sulfur compound.

In one form, the ball is a one-piece golf ball which is entirely formed of the present rubber composition.

In another form, the ball is a multi-layered golf ball comprising a core and a cover enclosing the core, wherein the core is formed of the present rubber composition. The core may be enclosed in the cover directly or through an intermediate layer.

DETAILED DESCRIPTION OF THE INVENTION

Figure 1:
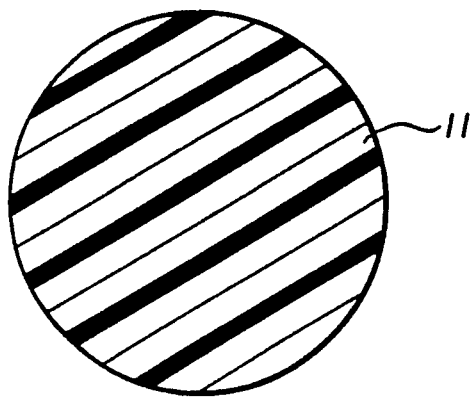
FIG. 1 is a cross section of a one-piece golf ball.
Figure 2:
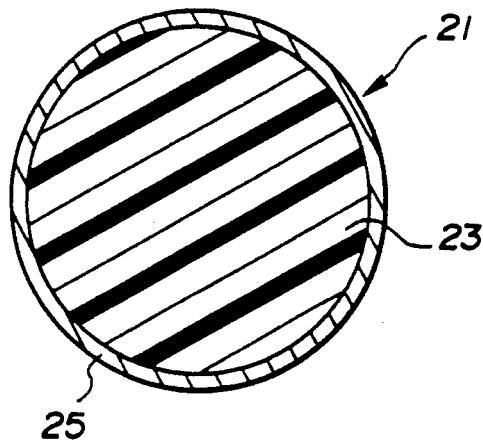
FIG. 2 is a cross section of a two-piece golf ball.

FIG. 1 shows in cross section a one-piece golf ball 11. FIG. 2 shows a two-piece golf ball 21 comprising a core 23 coated with a cover 25. A plurality of, usually 200 to 600, dimples are formed on the surface of the golf balls, although they are not shown in FIGS. 1 and 2.

The solid golf ball of the present invention is a one piece golf ball or a multi-layered golf ball in which the one-piece golf ball or the core of the multi-layered golf ball is formed from a rubber composition comprising a base rubber, an unsaturated carboxylic acid metal salt, and an organic sulfur compound and/or a metal-containing organic sulfur compound.

The base rubber used herein may be any desired rubber which is commonly used in conventional one-piece golf balls and cores of multi-layered golf balls. Polybutadiene rubbers, especially poly(1,4-butadiene) rubbers containing at least 40 mol %, preferably 80 to 100 mol % of cis-1,4 bond are preferred because of high rebound resilience, extrusion moldability, and high strength after vulcanization. If desired, the poly(1,4-butadiene) rubbers may be blended with natural rubber, polyisoprene rubber, styrene-butadiene rubber or the like. It is desired that at least 80% by weight of poly(1,4-butadiene) rubber be present in the base rubber because base rubbers containing less amounts of poly(1,4-butadiene) rubber often fail to take advantage of the rebound resilience of polybutadiene rubber.

The metal salt of unsaturated carboxylic acid is blended as a co-crosslinking agent. Examples include zinc and magnesium salts of unsaturated fatty acids having 3 to 8 carbon atoms, such as acrylic acid, methacrylic acid, maleic acid, and fumaric acid, with the zinc salts of acrylic and methacrylic acid being most preferred. The unsaturated carboxylic acid metal salt may be blended in a rubber either as a preformed metal salt or by introducing an $\alpha,\beta$-unsaturated carboxylic acid and a metal oxide or hydroxide into the rubber composition and allowing them to react in the rubber composition to form a metal salt. The unsaturated carboxylic acid metal salt may be blended in any desired amount, but preferably in amounts of about 25 to about 40 parts by weight per 100 parts by weight of the base rubber.

The rubber composition used in the manufacture of the solid golf ball of the invention contains an organic sulfur compound and/or a metal-containing organic sulfur compound in addition to the base rubber and the unsaturated carboxylic acid metal salt. Examples of the organic sulfur compound include thiophenols such as pentachlorothiophenol, 4-butyl-o-thiocresol, 4 t-butyl-p-thiocresol, and 2-benzamidothiophenol, thiocarboxylic acids such as thio-benzoic acid, and sulfides such as dixylyl disulfide, di(o-benzamidophenyl) disulfide and alkylated phenol sulfides. Examples of the metal-containing organic sulfur compound include zinc salts of the above-mentioned thiophenols and thiocarboxylic acids. The sulfur compounds may be used alone or in admixture of two or more of them. The sulfur compound is preferably blended in amounts of from about 0.05 to about 2 parts by weight, more preferably from about 0.1 to about 0.5 parts by weight per 100 parts by weight of the base rubber.

The rubber composition of the invention may further contain a co-crosslinking initiator. Preferred examples of the co-crosslinking initiator include organic peroxides, such as dicumyl peroxide, t-butylperoxybenzoate, di-t-butylperoxide, 1,1-bis(t-butylperoxy)-3,3,5 trimethyl-cyclohexane, n-butyl-4,4-bis(t-butylperoxy)valerate, 2,2,-bis(t-butylperoxy-isopropyl)benzene, and 2,5-dimethyl-2,5-di(t-butylperoxy)hexene, with the dicumyl peroxide being most preferred. The initiator may be blended in amounts of about 0.5 to about 3 parts by weight, preferably about 1 to about 2.5 parts by weight per 100 parts by weight of the base rubber.

Also employable is a filler. Preferred examples of the filler include metal oxides such as zinc oxide and magnesium oxide. It may be blended in amounts of about 10 to about 80 parts by weight per 100 parts by weight of the base rubber. If desired, the rubber composition can additionally contain a plasticizer, an antioxidant, and any other additives which are generally employed in the preparation of one-piece balls or cores of multi-layered balls. Their amounts may be determined without undue experimentation.

The solid golf ball of the invention may be prepared by molding the above-formulated rubber composition as formulated above into a desired spherical shape, that is, a ball in the case of a one-piece ball or into a core in the case of a multi-layered ball and vulcanizing the rubber by heating. The manufacture may be in accord with conventional method and conditions.

When multi-layered golf balls such as two-piece balls are manufactured, the core is coated with a cover. The cover material used herein may be selected from commonly used cover materials, for example, ionomers such as Surlyn ®, polyesters, and nylons. The cover usually has a thickness of 0.5 to 2.5 mm.

The core may be enclosed in the cover directly or through an intermediate layer.

The present invention may be applied to any type of golf ball including small balls having a diameter of at least 41.15 mm and a weight of up to 45.92 g, and large balls having a diameter of at least 42.67 mm and a weight of up to 45.92 g.

The distribution and total number of dimples are not critical although 300 to 550 dimples, preferably 350 to 540 dimples are generally formed on a ball. Preferred dimple arrangements are regular icosahedral, regular dodecahedral, and regular octahedral arrangements. The dimples is preferably distributed uniformly on the ball surface in such an arrangement.

The solid golf balls of the invention are of the above-mentioned construction and exhibit excellent flying performance.

EXAMPLE

Examples of the invention are given below together with comparative examples by way of illustration and not by way of limitation.

EXAMPLES 1-6

Solid cores for two-piece golf balls were prepared and compared with conventional two-piece golf ball cores.

Six rubber compositions were prepared by mixing the ingredients shown in Table 1. A two-piece golf ball-forming solid core having a diameter of 38.0 mm was prepared by molding each of the compositions in a mold followed by vulcanization at 155° C. for 20 minutes. The cores were examined by a hitting test according to the USGA standard. Using a hitting machine of the flywheel type, the cores were hit at a head speed of 38 m/sec. to measure the initial velocity (in m/sec.). The results are shown in Table 1.

TABLE 1

| | Core No. | | | | | |
|---|---|---|---|---|---|---|
| | 1 | 2 | 3 | 4* | 5* | 6* |
| Ingredients (pbw) | | | | | | |
| Poly(cis-1,4-butadiene) | 100 | 90 | 80 | 100 | 90 | 80 |
| Poly(cis-isoprene) | 0 | 10 | 20 | 0 | 10 | 20 |
| Zinc acrylate | 32 | 32 | 32 | 32 | 32 | 32 |
| Zinc oxide | 21 | 21 | 21 | 21 | 21 | 21 |
| Antioxidant | 0.2 | 0.2 | 0.2 | 0.2 | 0.2 | 0.2 |
| Dicumyl peroxide | 1.5 | 1.5 | 1.5 | 1.5 | 1.5 | 1.5 |
| Pentachlorothiophenol zinc salt | 0.2 | 0.2 | 0.2 | 0 | 0 | 0 |
| Initial velocity, m/sec. | 73.32 | 73.11 | 72.80 | 72.95 | 72.67 | 72.30 |

*outside the scope of the invention

As seen from Table 1, the performance, that is, initial velocity upon hitting of the core is improved by blending zinc salt of pentachlorothiophenol which is a metal salt of an organic sulfur compound in a rubber composition.

Examples 7 and 8

Two rubber compositions were prepared by blending the ingredients shown in Table 2. Two-piece golf ball solid cores having a diameter of 38 mm were prepared by molding the composition in a mold and vulcanizing at 155° C. for 20 minutes. An ionomer resin composition was applied to the cores to form a cover thereon. There were obtained two-piece golf balls having a diameter of 42.7 mm.

The balls were measured for weight, hardness and initial velocity. The hardness of the balls was measured as a deflection (in mm) under a load of 100 kg. The initial velocity (in n/sec.) of the balls was measured by a hitting test according to the USGA standard in which the balls were hit at a head speed of 38 m/sec. using a hitting machine of the flywheel type. The results are shown in Table 2.

TABLE 2

| | Example | |
|---|---|---|
| | 7 | 8* |
| Core composition (pbw) | | |
| Poly(cis-1,4-butadiene) rubber | 100 | 100 |
| Zinc acrylate | 32 | 32 |
| Zinc oxide | 21 | 21 |
| Antioxidant | 0.2 | 0.2 |
| Dicumyl peroxide | 1.5 | 1.5 |
| Pentachlorothiophenol zinc salt | 0.2 | — |
| Ball properties | | |
| Weight, g | 45.3 | 45.3 |
| Hardness | 2.30 | 2.32 |
| Initial velocity, m/sec. | 73.37 | 72.84 |

*outside the scope of the invention

As seen from Table 1, the gold balls of the invention are improved in initial velocity upon hitting and hence, in flying performance.

Although some preferred embodiments have been described, many modifications and variations may be made thereto in the light of the above teachings. It is therefore to be understood that within the scope of the appended claims, the invention may be practices otherwise than as specifically described.

We claim:

1. A solid golf ball, having an improved rebound property and initial velocity, comprising a rubber composition containing 100 parts by weight of a base rubber selected from the group consisting of polybutadiene rubber, natural rubber, polyisoprene rubber and styrene-butadiene rubber, about 25 to about 40 parts by weight of a zinc or magnesium salt of an unsaturated fatty acid having 3 to 8 carbon atoms, about 0.05 to about 2 parts by weight of a sulfur compound selected from the group consisting of pentachlorothiophenol, 4-t-tubyl-o-thiocresol, 4-t-butyl-p-thiocresol, 2-benzamidothiophenol, thiobenzoic acid, and zinc salts thereof, and about 0.5 to about 3 parts by weight of an organic peroxide.

2. The solid golf ball of claim 1, wherein said solid golf ball is a one-piece golf ball which is formed of said rubber composition.

3. The solid gold ball of claim 1, wherein said solid golf ball core and a cover enclosing the core, and said core is formed of said rubber composition.

4. The solid golf ball of claim 3, wherein said solid golf ball is a two-piece ball, and said core is directly enclosed in the cover.

5. The solid gold ball of claim 3, wherein said solid golf ball further comprises an intermediate layer between the core and the cover.

6. The solid golf ball of claim 1, wherein said base rubber is a polybutadiene rubber.

7. The solid gold ball of claim 6, wherein said polybutadiene rubber is a poly(1,4-butadiene) rubber containing at least 40 mol % of cis-1,4 bond.

8. The solid golf ball of claim 7, wherein said poly(1,4-butadiene) rubber contains at least 80 to 100 mol % of cis-1,4 bond.

9. The solid golf ball of claim 7, wherein said base rubber comprises at least 80% by weight of said poly(1,4-butadiene) rubber.

10. The solid golf ball of claim 9, wherein said poly(1,4-butadiene) rubber is blended with a natural rubber, a polyisoprene rubber of a styrene-butadiene rubber.

11. The solid gold ball of claim 1, wherein said sulfur compound is blended in an amount of from about 0.1 to about 0.5 parts by weight.

12. The solid golf ball of claim 1, wherein said organic peroxide is selected from the group consisting of dicumyl peroxide, t-butylperoxybenzoate, di-t-butylperoxide, 1,1-bis(t-butylperoxy)-3,3,5-trimethylcyclohexane, n-butyl-4,4-bis(t-butylperoxy)valerate, 2,2'-bis(t-butylperoxyisopropyl)benzene, and 2,5-dimethyl-2,5-di(t-butylperoxy)hexene.

13. The solid golf ball of claim 1, wherein said rubber composition further comprises a filler.

* * * * *